United States Patent
Rusakov et al.

(10) Patent No.: US 11,052,587 B2
(45) Date of Patent: Jul. 6, 2021

(54) MODULAR MOLDING SYSTEMS AND METHODS FOR MAKING BATTING HELMETS

(71) Applicant: EASTON DIAMOND SPORTS, LLC, Thousand Oaks, CA (US)

(72) Inventors: Dmitry Rusakov, Montreal (CA); Ian Fung, Los Angeles, CA (US)

(73) Assignee: EASTON DIAMOND SPORTS, LLC, Thousand Oaks, CA (US)

( * ) Notice: Subject to any disclaimer, the term of this patent is extended or adjusted under 35 U.S.C. 154(b) by 302 days.

(21) Appl. No.: 16/111,497

(22) Filed: Aug. 24, 2018

(65) Prior Publication Data

US 2020/0061890 A1 Feb. 27, 2020

(51) Int. Cl.
*B29C 45/26* (2006.01)
*B29C 45/40* (2006.01)
*B29L 31/48* (2006.01)

(52) U.S. Cl.
CPC .............. *B29C 45/26* (2013.01); *B29C 45/40* (2013.01); *B29L 2031/4821* (2013.01)

(58) Field of Classification Search
CPC . B29C 45/2673; B29C 45/2675; B29C 45/26; B29C 45/40; B29C 45/4421; B29C 2045/2677; B29C 33/301; B29C 33/302
See application file for complete search history.

(56) References Cited

U.S. PATENT DOCUMENTS

| | | | |
|---|---|---|---|
| 3,103,705 A * | 9/1963 | Letica | B29C 45/2602 249/68 |
| 4,677,694 A | 7/1987 | Crow | |
| 5,424,021 A * | 6/1995 | Nakade | A42B 3/06 264/257 |
| 5,824,249 A * | 10/1998 | Leitch | B29C 33/306 264/219 |
| 2011/0271430 A1* | 11/2011 | Lowe | A63B 71/10 2/425 |

OTHER PUBLICATIONS

Lukas, Paul, "The C-Flap helmet is helping MLB save face", ESPN, available at http://www.espn.com/mlb/story/_/id/23026863/the-mlb-c-flap-helmet-saving-faces-all-star, Apr. 8, 2018.

* cited by examiner

*Primary Examiner* — Galen H Hauth
(74) *Attorney, Agent, or Firm* — Perkins Coie LLP

(57) ABSTRACT

A system for manufacturing a shell for a batting helmet includes interchangeable mold-core portions configured to form a cavity for receiving molding material. The mold-core portions include a first base mold-core portion and a plurality of inner side mold-core portions configured to form an interior contour of the shell. The mold-core portions further include a second base mold-core portion and a plurality of outer mold-core portions configured to form an exterior contour of the shell. Mold-core portions are interchangeable, removable, and replaceable from an interlocked position relative to other mold-core portions. A method of manufacturing batting helmet shells includes selecting mold-core portions corresponding to various helmet shell configurations having various protective features, assembling the mold-core portions into a mold assembly, and providing molding material into a cavity in the mold assembly. A kit of parts for making a shell for a batting helmet includes a variety of interchangeable mold-core portions.

22 Claims, 4 Drawing Sheets

MODULAR MOLDING SYSTEMS AND METHODS FOR MAKING BATTING HELMETS

BACKGROUND

Helmets, such as batting helmets for baseball or softball, may include protection for a player's maxillary and mandibular regions (the cheek and jaw area) and for a player's orbital region (the eye area). Such protection may be in the form of a curved plate or shell attached to, and extending from, the main body of a helmet. Some helmets may be symmetric, such that the sides of the helmet are the same size and shape. Other helmets with cheek and jaw protection may be asymmetric (for example, asymmetric relative to a plane between a front part of the helmet and a rear part of the helmet). For example, cheek and jaw protection may only be provided on one side of the helmet. Many batters prefer symmetric helmets, but some batters prefer asymmetric helmets to account for their substantially perpendicular position relative to the incoming pitch. Asymmetrical helmets, however, may involve increased production costs.

SUMMARY

A system for manufacturing a shell for a batting helmet includes interchangeable mold-core portions configured to form a cavity for receiving molding material. The mold-core portions include a first base mold-core portion and a plurality of inner side mold-core portions configured to form an interior contour of the shell. The mold-core portions further include a second base mold-core portion and a plurality of outer mold-core portions configured to form an exterior contour of the shell. Mold-core portions are interchangeable, removable, and replaceable from an interlocked position relative to other mold-core portions. A method of manufacturing batting helmet shells includes selecting mold-core portions corresponding to various helmet shell configurations having various protective features, assembling the mold-core portions into a mold assembly, and providing molding material into a cavity in the mold assembly. A kit of parts for making a shell for a batting helmet includes a variety of interchangeable and interlockable mold-core portions.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to modular molding systems and methods for making batting helmets. Various embodiments of the technology will now be described. The following description provides specific details for a thorough understanding and enabling description of these embodiments. One skilled in the art will understand, however, that the technology may be practiced without many of these details. Additionally, some well-known structures or functions, such as structures or functions common to batting helmets, plastic or polymer molding processes, or safety equipment in general, may not be shown or described in detail to avoid unnecessarily obscuring the relevant description of the various embodiments. Accordingly, embodiments of the present technology may include additional elements or exclude some of the elements described below with reference to FIGS. 1-7, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Specific details of several embodiments of the present technology are described herein with reference to baseball or softball. Embodiments of the present technology may be used in other protective equipment or in other sports or industries.

Figure 1:
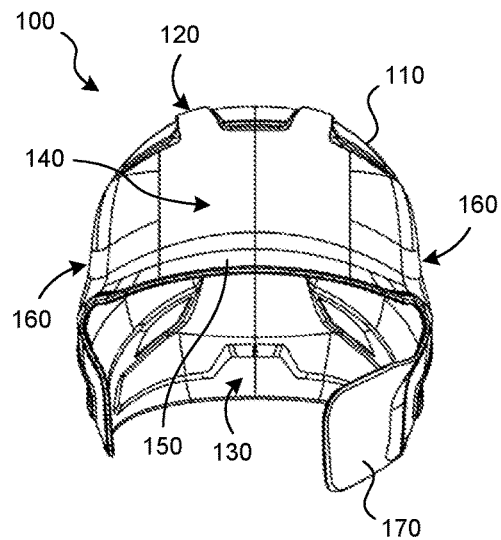
FIGS. 1-3 illustrate views of a batting helmet according to an embodiment of the present technology.
Figure 2:
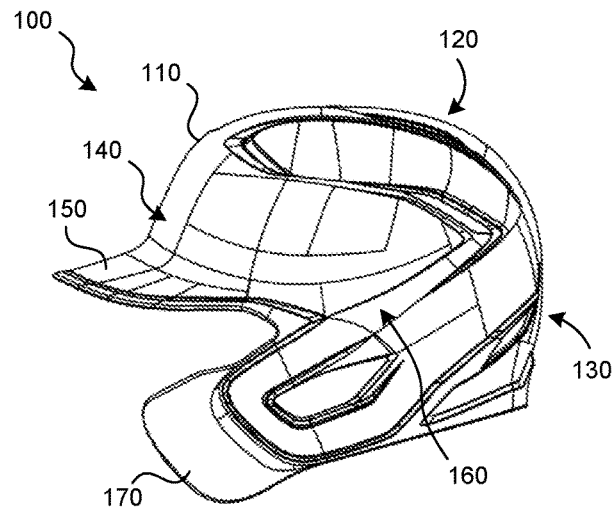
Figure 3:
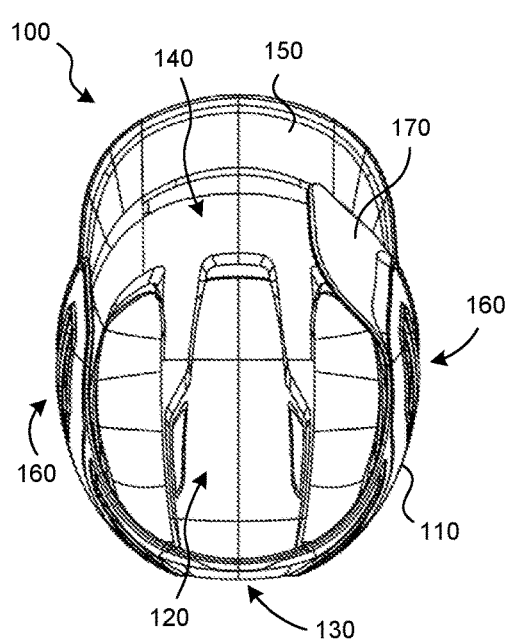

Turning now to the drawings, FIG. 1 illustrates a front view of a batting helmet 100 according to an embodiment of the present technology. FIG. 2 illustrates a side view of the batting helmet 100, and FIG. 3 illustrates a bottom view of the batting helmet 100. The batting helmet 100 includes a rigid or semi-rigid shell 110 which may be partially or fully lined with a shock-absorbing material, which is not shown but is understood to those within the art. For example, the shock-absorbing material may include foam, gel, fabric, or other various forms of padding, liner(s), or other shock-absorbing material suitable for absorbing impact forces transmitted from the shell 110. Comfort padding, or other comfort-providing material, may also be included inside the shell 110.

The shell 110 may include a crown region 120, a rear region 130, a front (forehead) region 140 with or without an optional visor 150, and side regions 160. In general, the shell 110 may be configured to cover most or all of a player's head, with the exception of the player's face, which may generally be exposed or partially covered.

In some embodiments, the shell 110 may include one or more additional protective features, such as a jaw guard 170. The jaw guard 170 may be configured (such as sized and shaped) to coextend with a user's mandible and maxilla, a user's cheek bones, a user's chin, or other anterior and lower portions of a user's face. The jaw guard 170 may protect a player's cheek, jaw, chin, or eye areas, or any suitable combination of cheek, jaw, chin, or eye areas. In FIGS. 1-3, the jaw guard 170 is illustrated as extending from the left side 160 of the shell 110. Accordingly, the helmet 100 is an asymmetrical helmet, having jaw protection on one side 160 rather than both sides 160. However, in other embodiments, the jaw guard 170 may be positioned on the right side 160, on each side 160, or neither side 160. In other embodiments, other protective features, such as ear guards (extensions of the helmet 100 covering a user's ear), chin guards (extensions of the helmet 100 positioned to cover the front of a user's chin), or other protective shapes may be positioned on either side 160 or both sides 160 of the shell 110.

Protective features may be positioned at various symmetrical and asymmetrical locations on the shell 110. In some embodiments, protective features on opposing sides 160 may be the same size and shape as each other or they may have different sizes, shapes, or positions. For example, a right-handed batter may prefer a protective feature (such as a jaw guard or ear guard) on the left side of the helmet for increased protection from an incoming pitch, with reduced coverage on the right side to facilitate air flow, awareness of game play, and reduced overall helmet weight.

Embodiments of the present technology provide modular molding systems and methods to make any configuration of helmet 100 described herein, or other suitable configurations.

Figure 4:
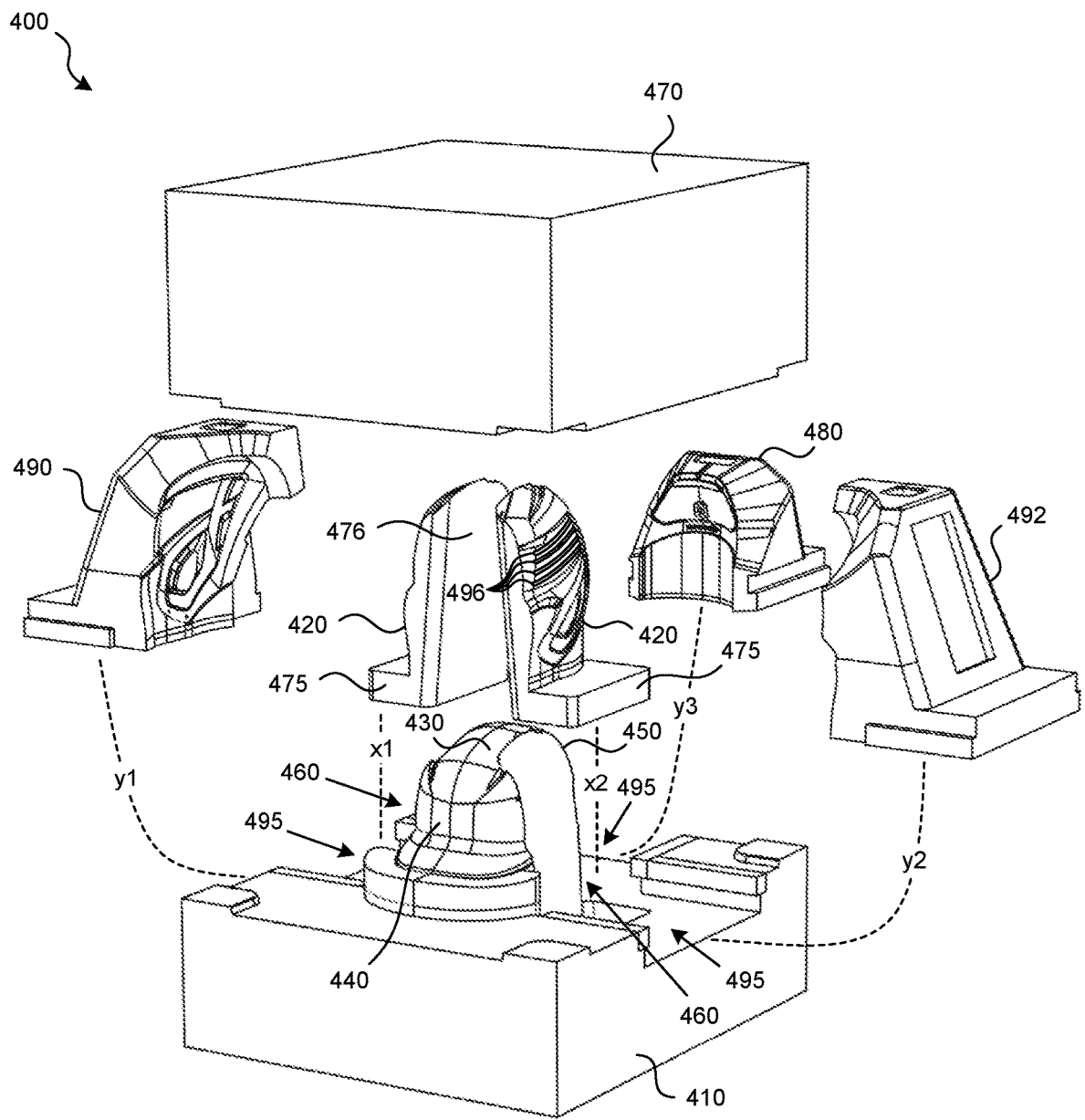
FIG. 4 illustrates a modular molding system in accordance with an embodiment of the present technology.

FIG. 4 illustrates a modular molding system 400 in accordance with an embodiment of the present technology. The modular molding system 400 includes a plurality of mold-core portions configured and arranged to be brought together to form a cavity within which a molding material (such as plastic or polymer) may be received (such as injected or drawn in) to mold a helmet shell 110.

For example, a lower base mold-core portion 410 and one or more (such as two) inner side mold-core portions 420 may, together, form a male core portion of a molding system. In other words, each of the lower base mold-core portion 410 and the inner side mold-core portions 420 may be shaped to form an interior contour of a shell 110.

In some embodiments, the lower base mold-core portion 410 may include an inner front mold-core portion 440, an inner crown mold-core portion 430, and an inner rear mold-core portion 450. The inner side mold-core portions 420 may be seated adjacent to the inner front mold-core portion 440, the inner crown mold-core portion 430, and the inner rear mold-core portion 450. This seating may be accomplished, for example, by moving the inner side mold-core portions 420 along lines x1 and x2, respectively, to position and engage protrusions 475 and inwardly-facing surfaces 476 of the inner side mold-core portions 420 in correspondingly-shaped slots or recesses 460 in the lower base mold-core portion 410. In some embodiments, the inner side mold-core portions 420 may be positioned in the lower base mold-core portion 410 in other ways. The inner side mold-core portions 420 may be interchangeable (for example, removable and replaceable) with other inner side mold-core portions, and they may be interlocked with the lower base mold-core portion 410 and parts thereof.

An upper base mold-core portion 470 and one or more (such as three) outer mold-core portions 480, 490, 492 may, together, form a female core portion of a molding system. In other words, each of the upper base mold-core portion 470 and the outer mold-core portions 480, 490, 492 may be shaped to form an exterior contour of a shell 110.

In some embodiments, the upper base mold-core portion 470 may be contoured to form the exterior contour of the front (forehead) region 140 (with or without an optional visor 150) as shown in FIGS. 1-3. The rear outer mold-core portion 480 may be shaped to form the exterior contour of all or part of the rear region 130 of the shell 110. Two outer side mold-core portions 490, 492 may be shaped to form the exterior contour of all or part of the side regions 160 (with or without an optional jaw guard 170 or other protective features), as shown in FIGS. 1-3.

The outer mold-core portions 480, 490, 492 may be seated adjacent to, and spaced apart from, the inner side mold-core portions 420 and the inner crown male mold-core portion 430 (to form a cavity therebetween), for example, by moving the outer mold-core portions 490, 492, 480 along paths y1, y2, and y3, respectively, to position and seat the outer mold-core portions 490, 492, 480 in correspondingly shaped recesses 495 in the lower base mold-core portion 410. In some embodiments, the outer mold-core portions 480, 490, 492 may include rails or grooves corresponding with rails or grooves in the lower base mold-core portion 410 to facilitate sliding the outer mold-core portions 480, 490, 492 into the lower base mold-core portion 410 along a track (such as with interlocking sliding rails). In other embodiments, the outer mold-core portions 480, 490, 492 may merely be positioned in a receiving recess 495 or otherwise seated in or on the lower base mold core portion 410. The outer mold-core portions 480, 490, 492 may be interchangeable (for example, removable and replaceable) with other outer mold-core portions, and they may be interlocked with the upper base mold-core portion 470 and parts thereof, or with other mold-core portions.

When the mold-core portions (410, 420, 430, 440, 450, 470, 480, 490, 492) are brought together, a cavity in the shape of a shell 110 is positioned between adjacent core portions. For example, the lower base mold-core portion 410 and one or more other mold-core portions (such as portions 420, 430, 440, 450, 480, 490, or 492) may be received in the upper base mold-core portion 470 (which may be configured to receive all or part of the lower base mold-core portion 410 or other mold-core portions). The inner side mold-core portions 420 may be received between the outer mold-core portions 480, 490, 492. The cavity between the mold-core portions forming the exterior contour of the shell 110 and the mold-core portions forming the interior contour of the shell 110 may define a thickness of the shell 110. The cavity is then filled with a polymer material, such as a plastic material or another suitable material to mold the shell 110. For example, the cavity may be injected with material or material may be drawn into the cavity.

Although two inner side mold-core portions 420 and three outer mold-core portions 480, 490, 492 are illustrated and described, any suitable number of mold-core portions may be used to provide a shape of the shell 110.

According to embodiments of the present technology, the quantity, arrangement, and shape of mold-core portions facilitate molding various shapes, sizes, and configurations of helmets in a single molding or tooling kit. For example, one, both, or neither of the inner side mold-core portions 420 and their corresponding adjacent outer side mold-core portions 490, 492 may collectively form a cavity for protective features, such as a jaw guard 170 (see FIGS. 1-3). In some embodiments, one, both, or neither of the inner side mold-core portions 420 and their corresponding adjacent outer side mold-core portions 490, 492 may collectively form a cavity contoured to facilitate molding of other protective features, such as an ear guard, visor, or other helmet feature.

Figure 3A:
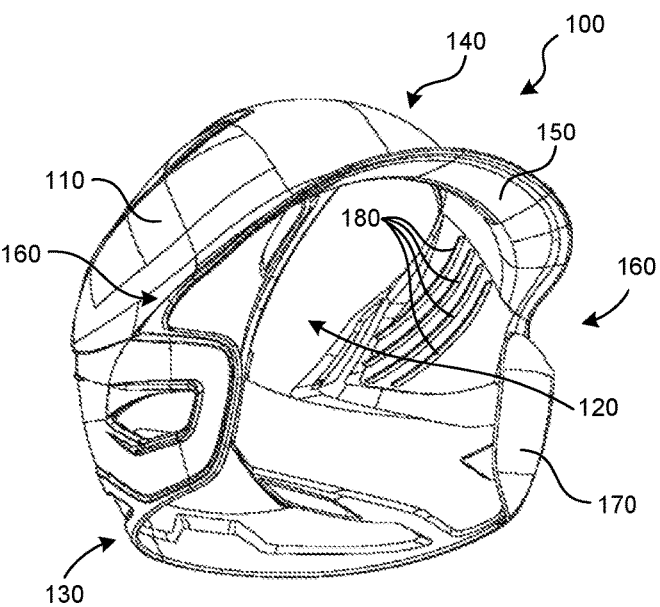
FIG. 3A illustrates a bottom perspective view of a batting helmet according to an embodiment of the present technology.

In some embodiments, one or more of the mold-core portions may be contoured to form protective features in the form of ribs extending along a side of the helmet (see ribs 180 illustrated in FIG. 3A). For example, the inner side mold-core portions 420 may include ribs 496 that provide corresponding ribs or contouring to the finished helmet. In some embodiments, one inner side mold-core portion 420 (left or right) may include ribs 496, while the other may optionally not include ribs 496. The outer side mold-core portions 490, 492 may have corresponding ribs, depending on whether the corresponding inner side mold-core portions 420 have ribs 496. A manufacturer or other user, therefore, may customize the inclusion or exclusion of ribs 496 on one or both sides of a helmet mold (and consequently, a helmet) depending on the desired helmet design. Ribs may provide enhanced protection by increasing impact attenuation (especially near the temporal lobe area of a user's head). A designer may optionally omit ribs from the side of a helmet facing away from the pitcher to reduce overall helmet weight. In some embodiments, there may be four ribs, some or all of which may be parallel to each other. In other embodiments, there may be more or fewer than four ribs, and the ribs need not be parallel in some embodiments (they may intersect each other). Ribs according to the present technology may be protrusions extending from the helmet 100 or indentations in the helmet 100. Other protective features in the shell 110 (such as those described below with regard to FIGS. 6 and 7) may be formed in a similar manner.

Advantages of embodiments of the present technology include allowing a manufacturer or other user to use the same tooling kit or system to create various symmetric or asymmetric helmets (for example, with a jaw guard 170 or ribs 180, or other protective features described herein, on one or both sides). The present technology provides reduced cost and complexity in manufacturing a variety of helmets. In addition, molding the jaw guard or other features integrally with the remainder of the helmet (as opposed to attaching them with fasteners or adhesive) improves the quality of the overall structure and eliminates the need for separate attachment elements, which improves safety for the end user. For example, in a molded helmet according to an embodiment of the present technology, impacts may be distributed along a larger surface area of the shell 110 rather than focusing the impact stress in a weak point, such as a fastened connection or other non-integral attachment. Likewise, an integrally formed helmet according to the present technology facilitates use of integrally-formed padding or liners for additional distribution of impact stresses. Because a helmet according to various embodiments of the present technology may include coverage extending from a user's ear, to a user's cheek, and potentially beyond to other areas of the head and face, such as wrapping around part of the user's mouth area, the total surface area covered by the helmet may be extensive compared to traditional helmets. A large continuous or mostly continuous pad or liner within the helmet may allow impact energy to be dispersed more evenly than several smaller protective pads or liners covering the same area.

Other embodiments allow designers to customize the shape, thickness, or other characteristics of the modular helmet mold in real-time during design, testing, and manufacturing efforts, without having to change entire sets of molding or tooling.

Figure 5:
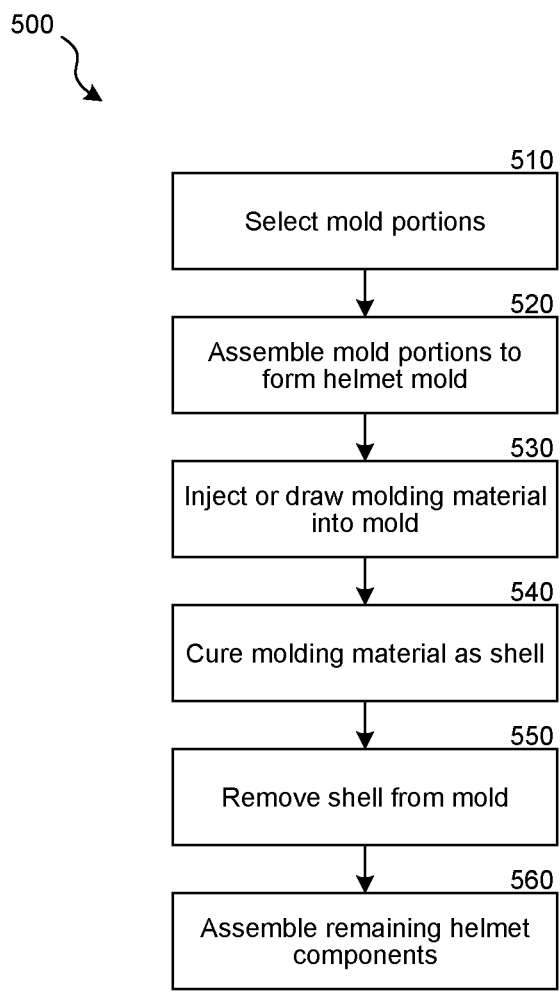
FIG. 5 illustrates a flow diagram of a modular method for making a helmet in accordance with an embodiment of the present technology.

FIG. 5 illustrates a flow diagram of a modular method 500 for making a helmet with a jaw protector or other protective features in accordance with an embodiment of the present technology. The method 500 may be carried out using, for example, a modular molding system configured in accordance with the present technology. In operation, beginning at block 510, a manufacturer or other user selects the mold-core portions corresponding to a desired helmet configuration, such as a symmetric helmet (with two or no jaw guards or other symmetric features) or an asymmetric helmet (with a jaw guard or other features on only the left or right side, or differently configured features on either side).

At block 520, the user assembles the selected mold-core portions into a complete helmet mold assembly formed by attaching or otherwise connecting the mold-core portions together. At block 530, the user injects or draws molding material into the mold (such as plastic or another polymer or other material suitable for making helmets). At block 540, the user allows the molding material to cure (as used herein, curing includes cooling of a previously-heated material or chemically curing as understood in the art of injection molding, for example) into its shape within the mold as a helmet shell. At block 550, the user removes the shell from the mold, for example, by removing the mold-core portions to access the shell inside the cavity between mold-core portions. At block 560, the user may attach other helmet components to the shell, such as padding, straps, or decorative indicia.

The method illustrated in FIG. 5 may be repeated with other mold-core portions or other groups of mold-core portions. A user may replace one or more mold-core portions or groups of mold-core portions with different mold-core portions or different groups of mold-core portions to alter the shape of the resulting helmet shell. For example, a user may replace certain side mold-core portions having one or more features with different configurations of side mold-core portions having other features (such as replacing a side mold-core portion having a contour for a jaw guard with a side mold-core portion without a contour for a jaw guard).

Figure 6:
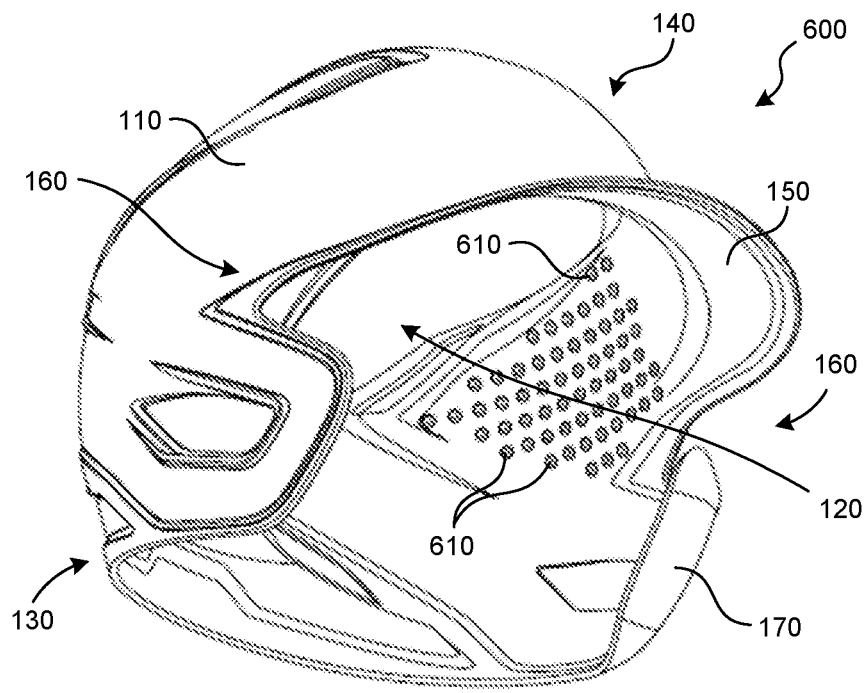
FIG. 6 illustrates a bottom perspective view of a batting helmet according to another embodiment of the present technology.

FIG. 6 illustrates a bottom perspective view of a batting helmet 600 according to another embodiment of the present technology. The helmet 600 may be generally similar to other helmets in accordance with the present technology, such as the helmet 100 illustrated in FIGS. 1-3A. In some embodiments, one or more of the mold-core portions (see FIG. 4) may be contoured to form protective features in a finished helmet 600 in the form of dimples 610 arranged in various patterns, such as rows and columns, or other patterns. The dimples 610 provide alternative modes of force and impact distribution, which may be used in addition to or alternatively to other protective features (such as ribs 180 in FIG. 3A), and may be on one side, or multiple sides of a helmet 600. A manufacturer or other user, therefore, may customize the inclusion or exclusion of protective features such as dimples 610 on one or more sides of a helmet mold (and consequently, a helmet 600) depending on the desired helmet design. Dimples 610 according to the present technology may be protrusions (domes) extending from the helmet 600 or indentations in the helmet 600.

Figure 7:
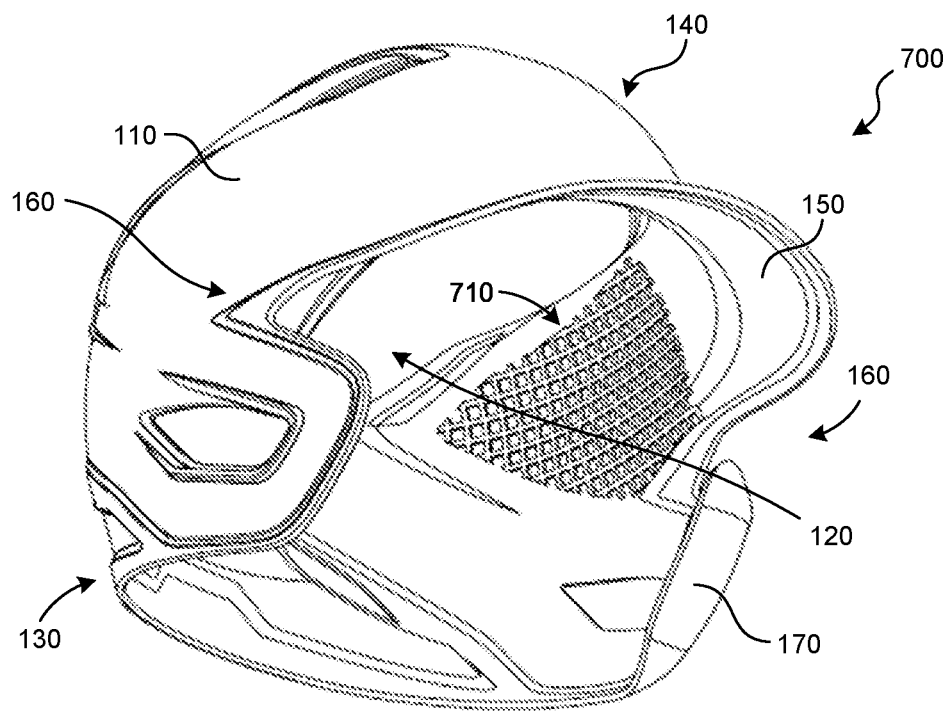
FIG. 7 illustrates a bottom perspective view of a batting helmet according to another embodiment of the present technology.

FIG. 7 illustrates a bottom perspective view of a batting helmet 700 according to another embodiment of the present technology. The helmet 700 may be generally similar to other helmets in accordance with the present technology, such as the helmet 100 illustrated in FIGS. 1-3A or the helmet 600 illustrated in FIG. 6. In some embodiments, protective features may be in the form of a waffle or grid pattern 710 on one or more sides of a helmet 700. The waffle or grid pattern 710 provides yet another alternative mode of force and impact distribution, and it may be used in addition to or alternative to other protective features (such as ribs 180 in FIG. 3A or dimples 610 in FIG. 6). The waffle or grid pattern 710 may include one or more protrusions extending from the helmet 700 or indentations in the helmet 700, or a mix of protrusions and indentations.

Other protective features molded into or onto shells 110 according to embodiments of the present technology include various shapes and patterns of indentations, protrusions, or groupings of indentations and protrusions, such as circles (cylinders), triangles, rectangles, squares, other rectilinear shapes, irregular shapes, honeycomb patterns, irregular patterns, or other shapes or patterns of protective features molded into one or more sides of helmet shells. Shapes and patterns of protective features need not be uniform and may vary (such as in size or pattern density) along the side region 160 or side regions 160 of helmets or they may be different on one side region 160 of a helmet than on another side region 160 of a helmet. Numerous variations of protective features are contemplated by embodiments of the present technology.

Embodiments according to the present technology provide modular systems and methods of creating a batting helmet. Such modular systems and methods may improve and economize manufacturing of batting helmets by facilitating custom molding options in the same molding system. For example, the same modular mold system may be used to mold helmets having various configurations and features. A user may select mold-core portions corresponding to the desired shell shape and substitute them for other mold-core portions within the molding system according to embodiments of the present technology.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, although some mold-core portions may be described and illustrated as upper or lower portions, in some embodiments, mold-core portions may be rearranged or configured in other ways, for example, such that the upper base mold-core portion is positioned beneath the lower base mold-core portion. In some embodiments, more or fewer mold-core portions may be used. For example, in some embodiments, the outer mold-core portions may be formed as two outer mold-core portions, such that one or both of the side outer mold-core portions (490, 492) include some or all of the rear outer mold-core portion 480. In some embodiments, the inner front mold-core portion, the inner rear mold-core portion, or the inner crown mold-core portion, or other mold-core portions in other embodiments, may be divided or separated into a plurality of discrete mold-core portions. Various embodiments of the technology may include helmets other than baseball or softball helmets, for other sports, activities, or industries.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A system for manufacturing a shell for a batting helmet, the system comprising:
   a plurality of mold-core portions configured to form a cavity for receiving a molding material, the plurality of mold-core portions comprising:
      a first base mold-core portion and a plurality of inner side mold-core portions configured to form an interior contour of the shell, wherein the inner side mold-core portions are removable and replaceable from an interlocked position relative to the first base mold-core portion such that they are interchangeable with other mold-core portions; and
      a second base mold-core portion and a plurality of outer mold-core portions configured to form an exterior contour of the shell, wherein the outer mold-core portions are removable and replaceable from an interlocked position relative to the second base mold-core portion such that they are interchangeable with other mold-core portions; wherein
   when the first base mold-core portion, inner side mold-core portions, second base mold-core portion, and outer mold-core portions are connected, the plurality of mold-core portions form the cavity for receiving the molding material.

2. The system of claim 1 wherein the first base mold-core portion comprises an inner front mold-core portion, an inner crown mold-core portion, and an inner rear mold-core portion.

3. The system of claim 2 wherein the inner side mold-core portions are configured to be seated adjacent to the inner front mold-core portion, the inner crown mold-core portion, and the inner rear mold-core portion.

4. The system of claim 3 wherein the inner side mold-core portions include one or more protrusions, the first base mold-core portion comprises one or more corresponding slots, and wherein the protrusions are configured to engage the slots.

5. The system of claim 1 wherein the second base mold-core portion is configured to form at least part of an exterior contour of a front region of the shell.

6. The system of claim 1 wherein the outer mold-core portions comprise a rear outer mold-core portion and two outer side mold-core portions, wherein the rear outer mold-core portion is configured to form an exterior contour of a rear region of the shell, and wherein the two outer side mold-core portions are configured to form exterior contours of side regions of the shell.

7. The system of claim 6 wherein only one of the outer side mold-core portions further comprises a contour configured to form a jaw guard.

8. The system of claim 6 wherein each of the two outer side mold-core portions further comprises a contour configured to form a jaw guard.

9. The system of claim 1 wherein the outer mold-core portions are slideable along rails or grooves in the first base mold-core portion to seat in recesses in the first base mold-core portion.

10. The system of claim 1 further comprising the molding material, wherein the molding material comprises a polymer material.

11. The system of claim 1 wherein one or more of the inner side mold-core portions is contoured to form protective features in the shell, wherein the protective features comprise ribs, dimples, or a waffle pattern.

12. A method of manufacturing batting helmet shells, the method comprising:

selecting a first group of mold-core portions corresponding to a first helmet shell configuration having one or more first protective features;

assembling the first group of mold-core portions to form a first mold assembly;

injecting or drawing molding material into the first mold assembly;

curing the molding material within the first mold assembly; and removing a first helmet shell from the first mold assembly;

wherein assembling the first group of mold-core portions to form a first mold assembly comprises:

moving an inner side mold-core portion along a first direction and seating the inner side mold-core portion in a base mold-core portion;

moving an outer side mold-core portion along a second direction and seating the outer side mold-core portion in the base mold-core portion, wherein the second direction is transverse to the first direction; and wherein injecting or drawing molding material into the first mold assembly comprises filling a cavity between the inner side mold-core portion and the outer side mold-core portion.

13. The method of claim 12, further comprising:

selecting a second group of mold-core portions corresponding to a second helmet shell configuration having one or more second protective features different from the first protective features;

after removing the first helmet shell from the first mold assembly, assembling the second group of mold-core portions to form a second mold assembly;

injecting or drawing molding material into the second mold assembly; and curing the molding material within the second mold assembly.

14. The method of claim 13 wherein selecting second mold-core portions comprises selecting at least some of the first mold-core portions to be the second mold-core portions, the method further comprising removing a second helmet shell from the second mold assembly, the second helmet shell having the one or more second protective features that are different from the first protective features.

15. The method of claim 12 wherein selecting the first group of mold-core portions comprises selecting mold-core portions such that the first helmet shell configuration is asymmetrical relative to a plane between a front part of the first helmet shell configuration and a rear part of the first helmet shell configuration.

16. The method of claim 12 wherein selecting the first group of mold-core portions comprises selecting the one or more first protective features from a group comprising a jaw guard, an ear guard, a visor, ribs, dimples, or an indented grid pattern.

17. The method of claim 12 wherein assembling the first group of mold-core portions to form the first mold assembly comprises interlocking two or more mold-core portions of the first group of mold-core portions together.

18. The method of claim 12, wherein moving the outer side mold-core portion along the second direction comprises moving the outer side mold-core portion along a track in the base mold-core portion.

19. A kit of parts for making a shell for a batting helmet, the kit comprising:

a first base mold-core portion comprising at least one of a front mold-core portion, a crown mold-core portion, or a rear mold-core portion;

a second base mold-core portion configured to interlock with the first base mold-core portion, with a cavity positioned between the second base mold-core portion and the first base mold-core portion;

a first inner side mold-core portion comprising a contour of a protective feature;

a second inner side mold-core portion; and a plurality of outer mold-core portions configured to interlock with one or more other mold-core portions in the kit with a cavity positioned between the outer mold-core portions and one or more of the other mold-core portions.

20. The kit of claim 19 wherein the protective feature comprises a jaw guard.

21. The kit of claim 19 wherein the protective feature comprises a first protective feature, and wherein the second inner side mold-core portion comprises a contour of a second protective feature different from the first protective feature.

22. The kit of claim 19 wherein the first base mold-core portion is an upper base mold-core portion, and the second base mold-core portion is a lower base mold-core portion, wherein the upper base mold-core portion is configured to receive at least a portion of the lower base mold-core portion.

* * * * *